(12) United States Patent
Imai et al.

(10) Patent No.: US 10,583,640 B2
(45) Date of Patent: Mar. 10, 2020

(54) METHOD FOR MANUFACTURING FIBER-REINFORCED COMPOSITE MATERIAL

(71) Applicant: TORAY INDUSTRIES, INC., Tokyo (JP)

(72) Inventors: Naokichi Imai, Nagoya (JP); Masato Honma, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 251 days.

(21) Appl. No.: 15/739,364

(22) PCT Filed: Jun. 30, 2016

(86) PCT No.: PCT/JP2016/069390
§ 371 (c)(1),
(2) Date: Dec. 22, 2017

(87) PCT Pub. No.: WO2017/006832
PCT Pub. Date: Jan. 12, 2017

(65) Prior Publication Data
US 2018/0186134 A1    Jul. 5, 2018

(30) Foreign Application Priority Data

Jul. 6, 2015 (JP) ................. 2015-135034
Jul. 6, 2015 (JP) ................. 2015-135035

(51) Int. Cl.
*B29C 33/68* (2006.01)
*B32B 27/32* (2006.01)
(Continued)

(52) U.S. Cl.
CPC .............. *B32B 27/32* (2013.01); *B29C 33/68* (2013.01); *B29C 43/18* (2013.01); *B29C 43/58* (2013.01);
(Continued)

(58) Field of Classification Search
CPC .......... B29C 33/68; B29C 43/58; B29C 70/46; B32B 1/04
See application file for complete search history.

(56) References Cited

U.S. PATENT DOCUMENTS

2016/0200007 A1    7/2016   Kasamatsu et al.

FOREIGN PATENT DOCUMENTS

| JP | 2012-218257 | * | 4/2011 | ............. B29C 43/02 |
| JP | 2012-218257 | A | 11/2012 | |

(Continued)

OTHER PUBLICATIONS

JP-2012-218257 (Yuto Taniguchi) Apr. 2011 (online machine translation), [Retrieved on Nov. 15, 2019]. Retrieved from: Espacenet (Year: 2011).*

(Continued)

*Primary Examiner* — Alison L Hindenlang
*Assistant Examiner* — Andrés E. Behrens, Jr.
(74) *Attorney, Agent, or Firm* — Birch, Stewart, Kolasch & Birch, LLP

(57) ABSTRACT

A method for producing a fiber-reinforced composite material is provided. By satisfying particular conditions, this method is capable of suppressing the problem of poor appearance caused by the release film in the production of the fiber-reinforced composite material having a three-dimensional shape by heat-press molding to enable production of the fiber-reinforced composite material having a high quality appearance in high cycle.
A method for manufacturing a fiber-reinforced composite material wherein a fiber-reinforced substrate containing a reinforcing fiber (A) and a thermosetting resin (B) is sandwiched between release films (C) to constitute a layered material, and the layered material is pressed in a mold heated to molding temperature to thereby cure the thermosetting resin (B), wherein (Continued)

the method satisfies the following (i), (ii), and (iii) or (i), (ii), and (iv):
(i) the fiber-reinforced composite material has at least 1 bent part,
(ii) the molding temperature is 130 to 180° C., and pressure application time is 0.5 to 20 minutes,
(iii) the release film (C) has a thermal contraction rate satisfying the following expressions (1) and (2):

$$0 < Ta \leq 20 \quad \text{expression (1), and}$$

$$1 \leq Ta - Tb \leq 20 \quad \text{expression (2),}$$

Ta: the thermal contraction rate (%) of the release film (C) measured by using a thermomechanical analyzer at the temperature the same as the molding temperature Tb: the thermal contraction rate (%) of the release film (C) measured by using a thermomechanical analyzer at a temperature 30° C. lower than the molding temperature, and (iv) hardness of the fiber-reinforced substrate and the hardness of the release film (C) measured by using a durometer corresponding to JIS-K-7215, type A satisfy the following expressions (3) and (4):

$$0.8 \leq Hrc/Hrf \leq 1.2 \quad \text{expression (3),}$$

$$1 < Hhc/Hhf \leq 1.5 \quad \text{expression (4),}$$

Hrc: hardness of the release film (C) at 30° C.,
Hrf: hardness of the fiber-reinforced substrate at 30° C.,
Hhc: hardness of the release film (C) at the molding temperature,
Hhf: hardness of the fiber-reinforced substrate at the molding temperature.

20 Claims, 2 Drawing Sheets

(51) Int. Cl.
| | |
|---|---|
| *B29C 43/18* | (2006.01) |
| *C08J 5/04* | (2006.01) |
| *B32B 5/28* | (2006.01) |
| *B29C 70/46* | (2006.01) |
| *B29C 43/58* | (2006.01) |
| *B32B 1/04* | (2006.01) |
| *B32B 27/20* | (2006.01) |
| *B32B 27/38* | (2006.01) |
| *C08J 5/24* | (2006.01) |

(52) U.S. Cl.
CPC ............ *B29C 70/46* (2013.01); *B32B 1/04* (2013.01); *B32B 5/28* (2013.01); *B32B 27/20* (2013.01); *B32B 27/38* (2013.01); *C08J 5/04* (2013.01); *C08J 5/042* (2013.01); *C08J 5/24* (2013.01); *B29C 2043/5816* (2013.01); *B32B 2250/40* (2013.01); *B32B 2305/08* (2013.01); *B32B 2307/536* (2013.01); *B32B 2307/748* (2013.01); *B32B 2323/10* (2013.01); *B32B 2363/00* (2013.01); *C08J 2323/12* (2013.01); *C08J 2363/00* (2013.01)

(56) References Cited

FOREIGN PATENT DOCUMENTS

| WO | WO 2014/061403 A1 | 4/2014 | |
| WO | WO-2014061403 A1 * | 4/2014 | ............ B32B 27/32 |
| WO | WO 2015/037426 A1 | 3/2015 | |
| WO | WO-2015037426 A1 * | 3/2015 | ............ B29C 33/68 |
| WO | WO 2016/006578 A1 | 1/2016 | |

OTHER PUBLICATIONS

WO-2014-061403 (Takada Yasushi) Apr. 2014 (online machine translation), [Retrieved on Nov. 15, 2019]. Retrieved from: Espacenet (Year: 2014).*
WO-2015-037426 (Matsuki Yutaka) Mar. 2015 (online machine translation), [Retrieved on Nov. 15, 2019]. Retrieved from: Espacenet (Year: 2015).*
International Search Report, issued in PCT/JP2016/069390, PCT/ISA/210, dated Sep. 6, 2016.

* cited by examiner

[FIG. 1]
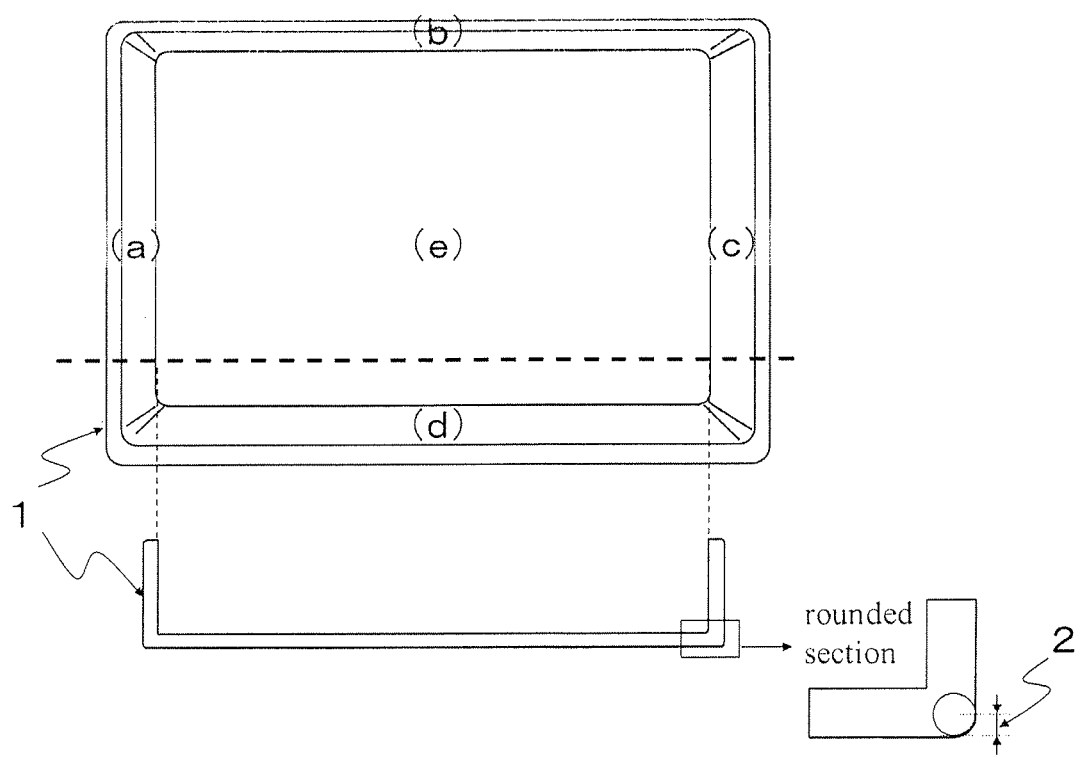

[FIG. 2]
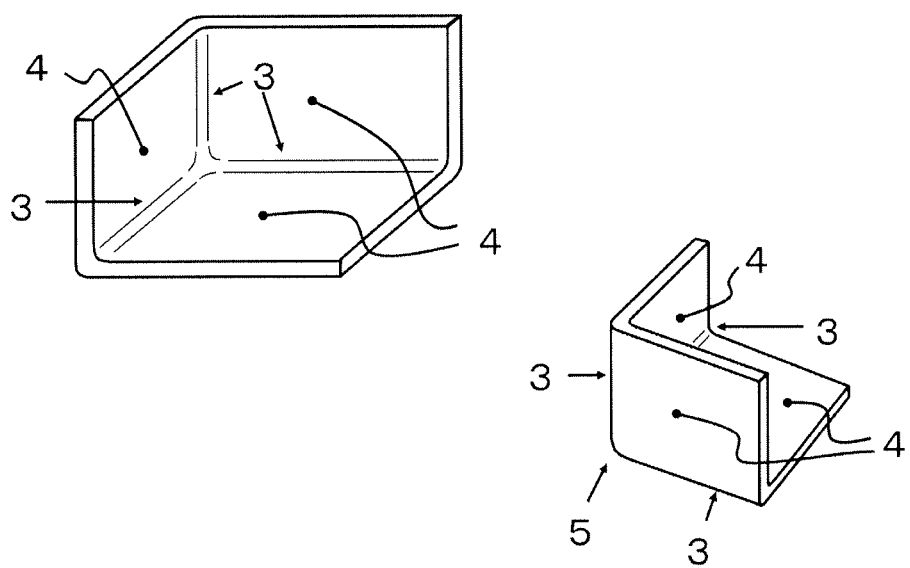

METHOD FOR MANUFACTURING FIBER-REINFORCED COMPOSITE MATERIAL

TECHNICAL FIELD

The present invention relates to a method for manufacturing a fiber-reinforced composite material having excellent three-dimensional shape and high-quality appearance at high productivity.

BACKGROUND ART

Fiber-reinforced composite materials comprising a reinforcing fiber and a thermosetting resin enjoy good balance between lightness and mechanical properties, and they have been widely used as structural members of an aircraft, automobile, or ship, housing of electronic device, sports applications, building materials, and other industrial materials. With increase of such demands, improvement of the production cycle has been a major technical challenge for the fiber-reinforced composite materials. One means for improving the production cycle is use of a release film in the molding by applying heat and pressure which is an improvement in the step of demolding the fiber-reinforced composite material from the mold.

Patent Document 1 discloses a release film having an excellent releasability from thermosetting resin members such as epoxy resin board.

Patent Document 2 discloses a method for producing a single-sided board wherein a prepreg is laminated with the release film.

Patent Document 3 discloses a release film used in the flexible printed board.

Patent Document 4 discloses a release film wherein a grain pattern is formed on the surface of the molded article by the transfer of the pattern of the weaven reinforcing fibers in the prepreg in the press molding.

However, the fiber-reinforced composite materials disclosed in Patent Documents 1 to 3 are those having plate shape, and Patent Document 4 relates to patterns on the surface of the fiber-reinforced composite material. With increasing demands on the fiber-reinforced composite materials, the fiber-reinforced composite materials are expected to have formability into various shapes in addition to improvements in the production cycle as described above, and in these applications, however, the fiber-reinforced composite materials according to the inventions disclosed in the Patent Documents 1 to 4 sometimes suffered from poor appearance.

PRIOR ART DOCUMENTS

Patent Documents

[Patent Document 1] Japanese Unexamined Patent Publication (Kokai) No. 2005-280125

[Patent Document 2] Japanese Unexamined Patent Publication (Kokai) No. 2007-290260

[Patent Document 3] International Publication WO2008/001682

[Patent Document 4] Japanese Unexamined Patent Publication (Kokai) No. 2005-254484

SUMMARY OF THE INVENTION

Problems to be Solved by the Invention

The present invention attempts to improve the problems of the prior art as described above, and an object of the present invention is to provide a method capable of suppressing the problem of poor appearance caused by the release film in the production of the fiber-reinforced composite material having a three-dimensional shape by heat-press molding to enable a production of the fiber-reinforced composite material having a high quality appearance in high cycle.

Means for Solving the Invention

The inventors of the present invention made an intensive study to solve the problems as described above, and found that a fiber-reinforced composite material having a three-dimensional shape with a high quality appearance can be molded at high productivity by satisfying particular conditions. The present invention was thereby completed. Accordingly, the present invention relates to a method for manufacturing a fiber-reinforced composite material wherein a fiber-reinforced substrate containing a reinforcing fiber (A) and a thermosetting resin (B) is sandwiched between release films (C) to constitute a layered material, and the layered material is pressed in a mold heated to molding temperature to thereby cure the thermosetting resin (B), wherein the method satisfies the following (i), (ii), and (iii) or (i), (ii), and (iv):

(i) the fiber-reinforced composite material has at least 1 bent part, (ii) the molding temperature is 130 to 180° C., and pressure application time is 0.5 to 20 minutes, (iii) the release film (C) has a thermal contraction rate satisfying the following expressions (1) and (2):

$$0 < Ta \le 20 \quad \text{expression (1), and}$$

$$1 \le Ta - Tb \le 20 \quad \text{expression (2),}$$

Ta: the thermal contraction rate (%) of the release film (C) measured by using a thermomechanical analyzer at the temperature the same as the molding temperature Tb: the thermal contraction rate (%) of the release film (C) measured by using a thermomechanical analyzer at a temperature 30° C. lower than the molding temperature, and (iv) hardness of the fiber-reinforced substrate and the hardness of the release film (C) measured by using a durometer corresponding to JIS-K-7215, type A satisfy the following expressions (3) and (4):

$$0.8 \le Hrc/Hrf \le 1.2 \quad \text{expression (3),}$$

$$1 < Hhc/Hhf \le 1.5 \quad \text{expression (4),}$$

Hrc: hardness of the release film (C) at 30° C.,
Hrf: hardness of the fiber-reinforced substrate at 30° C.,
Hhc: hardness of the release film (C) at the molding temperature,
Hhf: hardness of the fiber-reinforced substrate at the molding temperature.

Advantageous Effect the Invention

The present invention has enabled to suppress the problem of poor appearance caused by the release film in the production of the fiber-reinforced composite material having a three-dimensional shape by heat-press molding. The present invention has also enabled to produce a fiber-reinforced composite material having a high quality appearance at a high cycle.

BRIEF DESCRIPTION OF THE INVENTION

FIG. 1 is a schematic view showing an embodiment of the fiber-reinforced composite material.

FIG. 2 is a schematic view showing an embodiment of the apex.

EMBODIMENTS OF THE INVENTION

The method for manufacturing a fiber-reinforced composite material of the present invention is a method for manufacturing a fiber-reinforced composite material wherein a fiber-reinforced substrate containing a reinforcing fiber (A) and a thermosetting resin (B) is sandwiched between release films (C) to constitute a layered material, and the layered material is pressed in a mold heated to molding temperature to thereby cure the thermosetting resin (B), wherein the method satisfies the following (i), (ii), and (iii) or (i), (ii), and (iv):

(i) the fiber-reinforced composite material has at least 1 bent part, (ii) the molding temperature is 130 to 180° C., and pressure application time is 0.5 to 20 minutes, (iii) the release film (C) has a thermal contraction rate satisfying the following expressions (1) and (2):

$$0 < Ta \leq 20 \quad \text{expression (1), and}$$

$$1 \leq Ta - Tb \leq 20 \quad \text{expression (2),}$$

Ta: the thermal contraction rate (%) of the release film (C) measured by using a thermomechanical analyzer at the temperature the same as the molding temperature Tb: the thermal contraction rate (%) of the release film (C) measured by using a thermomechanical analyzer at a temperature 30° C. lower than the molding temperature, and (iv) hardness of the fiber-reinforced substrate and the hardness of the release film (C) measured by using a durometer corresponding to JIS-K-7215, type A satisfy the following expressions (3) and (4):

$$0.8 \leq Hrc/Hrf \leq 1.2 \quad \text{expression (3),}$$

$$1 < Hhc/Hhf \leq 1.5 \quad \text{expression (4),}$$

Hrc: hardness of the release film (C) at 30° C.,
Hrf: hardness of the fiber-reinforced substrate at 30° C.,
Hhc: hardness of the release film (C) at the molding temperature,
Hhf: hardness of the fiber-reinforced substrate at the molding temperature.

First, (i) is described in detail. In the fiber-reinforced composite material produced by the present invention, it is important that the product has at least one bent part, and accordingly, the present invention is a method for producing a fiber-reinforced composite material having at least one bent part. By enabling formation of the bent part in the production method of the fiber-reinforced composite material, production of the products having three-dimensional shape at efficient cycle has been enabled. In addition, convenient production of the fiber-reinforced composite material having excellent mechanical properties has been enabled by the reduction in number of the joints that should be formed in the subsequent steps.

The bent part of the present invention is described by referring to the drawings. FIG. 1 shows an embodiment of the fiber-reinforced composite material of the present invention. When the 5 faces constituting the fiber-reinforced composite material in FIG. 1 is designated (a) to (e), the parts joining the faces (a) to (e) are bent parts. For example, FIG. 1 includes 8 bent parts, namely, the bent part formed by the faces (a) and (b), the bent part formed by the faces (a) and (d), the bent part formed by the faces (a) and (e), the bent part formed by the faces (b) and (c), the bent part formed by the faces (b) and (e), the bent part formed by the faces (c) and (d), the bent part formed by the faces (c) and (e), the bent part formed by the faces (d) and (e).

In view of the capability of forming a fiber-reinforced composite material having a more complicated shape, the bent part of the fiber-reinforced composite material preferably has a length of 5 to 4000 mm, more preferably 10 to 3000 mm, and more preferably 10 to 2000 mm.

Next, (ii) is described in detail. In the present invention, the fiber-reinforced composite material having at least one bent part is produced by pressing the layered material as described below in a mold which has been heated to molding temperature to thereby produce the fiber-reinforced composite material having at least one bent part. The molding temperature used in this process is 130 to 180° C., preferably 130 to 170° C., and more preferably 140 to 160° C. Use of such molding temperature minimizes the poor appearance of the fiber-reinforced composite material resulting from the heat decomposition of the fiber-reinforced composite material and the release film (C). The molding temperature as used herein is the mold surface temperature obtained by directly measuring the mold surface using a thermometer. Exemplary thermometers used include thermocouple and non-contact thermometers using infrared, and the preferred in view of the measurement precision is use of a thermocouple.

In the method for manufacturing the fiber-reinforced composite material of the present invention, the time of pressure application is 0.5 to 20 minutes, preferably 1 to 10 minutes, and more preferably 2 to 5 minutes. Use of such pressure application time realizes a good balance between the production of the fiber-reinforced composite material in high cycle and high formability into the three-dimensional shape. The pressure application time as used herein is the time where the pressure is applied between the sandwiching of the layered material in the mold and removal of the layered material from the mold.

Next, (iii) is described in detail. In the present invention, the fiber-reinforced substrate as described below is sandwiched between release films (C) to constitute a layered material, and it is important that the release films (C) used in this process satisfies the expressions (1) and (2).

$$0 < Ta \leq 20 \quad \text{expression (1), and}$$

$$1 \leq Ta - Tb \leq 20 \quad \text{expression (2),}$$

Ta: the thermal contraction rate (%) of the release film (C) measured by using a thermomechanical analyzer at the temperature the same as the molding temperature Tb: the thermal contraction rate (%) of the release film (C) measured by using a thermomechanical analyzer at a temperature 30° C. lower than the molding temperature.

When the expression (1) is satisfied, expansion of the release film (C) and generation of creases will be avoided in the curing of the thermosetting resin (B) by the heating at molding temperature. As described above, Ta is in excess of 0% and up to 20%, preferably in excess of 0% and up to 10%, and more preferably in excess of 0% and up to 5%. When Ta is up to 0%, creases will be generated by the expansion of the release film (C) during the curing of the thermosetting resin (B) and the fiber-reinforced composite material may exhibit poor appearance due to the transfer of these creases to the exterior. On the other hand, Ta in excess of 20% may invite exposure of the fiber-reinforced substrate and the fiber-reinforced composite material due to the excessive contraction of the release film (C) and this may result in the contamination of the mold.

When the expression (2) is satisfied, contraction of the release film (C) within the preferable range will be realized during the pressure application time. There is usually a time lag between the placement of the layered material in the mold and the start of the pressure application, and the release film (C) in the mold will undergo temperature increase toward the molding temperature in this time lag before the actual pressure application. In the case of producing a fiber-reinforced composite material having the bent parts, the release film (C) is deformed into a three-dimensional shape, and creases are generated by the folding and overlapping of the release film (C). In view of reducing the creases generated by such mechanism, the release film (C) is preferably contracted within particular range during the pressure application time, and accordingly, it is important that the expression (2) is satisfied. As described above, Ta−Tb is at least 1% and up to 20%, preferably at least 1% and up to 10%, and more preferably at least 1% and up to 5%. When Ta−Tb is less than 1%, contraction of the release film (C) during the pressure application time will be insufficient, and the release film (C) will not follow the mold, and the fiber-reinforced composite material may suffer from poor appearance due to the transfer of the creases. The bent part is particularly susceptible to such poor appearance. On the other hand, Ta−Tb in excess of 20% may invite exposure of the fiber-reinforced substrate and the fiber-reinforced composite material due to the excessive contraction of the release film (C) during the pressure application time and this may result in the contamination of the mold.

In the case of high cycle molding of the fiber-reinforced composite material, curing of the thermosetting resin (B) in short time is preferable, and accordingly, simultaneous satisfaction of the expressions (1) and (2) is particularly important in obtaining a fiber-reinforced composite material having a high quality appearance.

In the present invention, the thermal contraction rate of the release film (C) is the value that can be measured by a thermomechanical analyzer when the temperature of the release film (C) is elevated to a predetermined temperature. For example, the value obtained by the method wherein the thermal contraction rate is calculated by using the size of the release film (C) before heating and the size of the release film (C) after heating to a predetermined temperature and cooling to room temperature does not represent the thermal contraction rate when the temperature of the release film (C) is elevated to a predetermined temperature.

Accordingly, the thermal contraction rate of the release film (C) in the present invention can be calculated by conducting a thermomechanical analysis from 30° C. to 180° C. under a constant load of 2 kgf at a temperature elevation rate of 5° C./minute, and measuring the sample length in the direction of the load at the timing when the temperature reached a particular temperature, and conducting the calculation by using the sample length at 30° C. for the reference. For example, the thermal contraction rate at X° C. can be calculated by the equation: [{(sample length when the sample is at 30° C.)−(sample length when the sample is at X° C.)}/(sample length when the sample is at 30° C.)×100(%)]. This also means that, in the present invention, the release film (C) has contracted compared to the state at 30° C. when the thermal contraction rate is a positive value and that the release film (C) has expanded compared to the state at 30° C. when the thermal contraction rate is a negative value. The thermal contraction rate of the release film (C) in MD and TD directions as described below may be obtained by respectively using the measurement in the direction parallel to the load application in the thermomechanical analysis for the representative value.

In the present invention, it is important that the thermal contraction rate in the MD direction satisfies both the expressions (1) and (2), and simultaneously, that the thermal contraction rate in the TD direction satisfies both the expressions (1) and (2). Satisfaction of the expressions (1) and (2) only in one direction cannot be regarded as a method capable of producing an excellent fiber-reinforced composite material.

Next, (iv) is described in detail. In the present invention, the fiber-reinforced substrate as described below is sandwiched between release films (C) to constitute a layered material, and it is important that the fiber-reinforced substrate and the release film (C) used in this process satisfy the following expressions (3) and (4).

$$0.8 \leq Hrc/Hrf \leq 1.2 \qquad \text{expression (3),}$$

$$1 < Hhc/Hhf \leq 1.5 \qquad \text{expression (4),}$$

Hrc: hardness of the release film (C) at 30° C.,
Hrf: hardness of the fiber-reinforced substrate at 30° C.,
Hhc: hardness of the release film (C) at the molding temperature,
Hhf: hardness of the fiber-reinforced substrate at the molding temperature.

When the expression (3) is satisfied, the fiber-reinforced substrate and the release film (C) will be deformed in the same way during the deformation of the layered material into the three-dimensional shape by the sandwiching of the layered material between the mold, and the crease generation is thereby avoided. As described above, Hrc/Hrf is at least 0.8 and up to 1.2, preferably at least 0.9 and up to 1.2, and more preferably at least 1.0 and up to 1.2. When Hrc/Hrf is less than 0.8, the release film (C) will undergo larger deformation than the fiber-reinforced substrate during the deformation of the layered material into the three-dimensional shape by the sandwiching of the layered material between the mold, and this results in the formation of large creases which may be transferred to the surface of the fiber-reinforced composite material to result in the poor appearance. When Hrc/Hrf is in excess of 1.2 and the release film (C) is hard, the release film (C) is incapable of undergoing the deformation like that of the fiber-reinforced substrate during the deformation of the layered material into the three-dimensional shape by the sandwiching of the layered material between the mold, and large creases are generated by the folding and overlapping of the release film (C). This large creases may be transferred to the surface of the fiber-reinforced composite material to result in the poor appearance.

When the expression (4) is satisfied, softening of the release film (C) within the preferable range will be realized during the pressure application time. In the production of a fiber-reinforced composite material having the bent parts, the release film (C) is typically deformed into a three-dimensional shape, and creases are generated by the folding and overlapping of the release film (C). In view of reducing the creases generated by such mechanism, the release film (C) is preferably softened to particular range during the pressure application time, and accordingly, it is important that the expression (4) is satisfied. As described above, Hhc/Hhf is in excess of 1 and up to 1.5, preferably at least 1.1 and up to 1.5, and more preferably at least 1.1 and up to 1.4. When Hrc/Hhf is up to 1, hardness of the release film (C) during the pressure application time will be insufficient, and the fiber-reinforced substrate will not follow the mold, and the fiber-reinforced composite material may not be formed into the desired shape. The bent part is particularly susceptible to such molding failure. When Hhc/Hhf is in excess of 1.5, size of the creases generated by the folding and overlapping of the release film (C) will not be reduced due to the high hardness of the release film (C) during the pressure application time, and this may result in the poor appearance.

In particular, in the high cycle molding of the fiber-reinforced composite material, the thermosetting resin (B) is preferably cured in short time, and it is important that the release film (C) simultaneously satisfies the expressions (3) and (4) for obtaining a fiber-reinforced composite material having a high quality appearance.

In the present invention, hardness of the release film (C) or the fiber-reinforced substrate is the value at the predetermined temperature that can be measured by using the durometer corresponding to JIS-K-7215:1986, type A. More specifically, the hardness of the release film (C) or the fiber-reinforced substrate can be measured by pressing an indenter of the durometer as described above to the sample which has been heated to the predetermined temperature.

In the present invention, in view of forming a complicated shape on the fiber-reinforced composite material, the present invention is preferably used in the case wherein the radius of curvature at the rounded section of the bent part is up to 20 mm, more preferably in the case wherein the radius of curvature is up to 10 mm, and still more preferably in the case wherein the radius of curvature is up to 5 mm. The release film (C) is more likely to become creased and formation of the fiber-reinforced composite material having a high quality appearance becomes difficult when the radius of curvature is smaller, and the merit of the present invention will be more apparent when the present invention is used for the case wherein the radius of curvature is up to 20 mm. While there is no particular lower limit for the radius of curvature, the lower limit is typically at least 0.1 mm.

The rounded section in the bent part is the part constituting the curved surface in the bent part as shown in the magnified view in FIG. 1. In addition, radius of curvature of the circle that fits best with the bending of the rounded section is used to represent the degree of bending in the rounded section as shown in FIG. 1. The radius of curvature is determined by preparing an image of the cross-section of the bent part of the fiber-reinforced composite material by observing the cross-section with an optical microscope, fitting various circles (having different radii at an increment of 1 mm) with the image to find a circle that fits best with the bending of the rounded part (the circle having the longest periphery fitting with the bending of the rounded part), and using the radius of this circle for the radius of curvature. The measurements were conducted 5 times per 1 bent part, and the average was calculated for use as the radius of curvature of the rounded part of the bent part.

Furthermore, in view of imparting a complicated shape with the fiber-reinforced composite material, number of the bent part is preferably at least 3, and more preferably at least 8. The number of the bent part is 1 when a plate is simply bent, and the number of the bent part is 2 when the plate is bent twice in U-shape. The risk of crease generation of the release film (C) increases with increase in the number of the bent parts and production of a fiber-reinforced composite material having a high quality appearance also becomes difficult, and therefore, the merit of the present invention is more significant when the number of the bent part is 3 or more. While there is no particular upper limit for the number of the bent parts, the fiber-reinforced composite material produced is preferably the one having up to 1000 bent parts.

In addition, the fiber-reinforced composite material is preferably a fiber-reinforced composite material having apex (es) constituted by at least 3 faces each defined by bent parts in view of widening the range of application to those having the shape of various cases, housings, and members. The "the apex constituted by at least 3 faces each defined by bent parts" is the part shown by numeral "5" in FIG. 2. The shape having apex(es) constituted by 3 faces is likely to suffer from the risk of crease generation when a planar shape release film (C) is used. Accordingly, the merit of the present invention is more significant when the present invention is used for a fiber-reinforced composite material having apex (es). The production method of the present invention is preferably used for the fiber-reinforced composite material wherein the number of apex is at least 2, and more preferably at least 4. Although there is no particular upper limit for the number of the apex, the number of apex is typically up to 100. While the apex has been described for the one constituted from 3 faces as a typical case, the number of faces constituting the apex is not particularly limited.

The fiber-reinforced composite material of the present invention preferably has a dispersion R calculated by the expression (5) of 0 to 0.2, and more preferably 0 to 0.1.

$$R=R_{sd}/R_{ave} \quad \text{expression (5)}$$

Ra: arithmetic mean roughness of each face defined by the bent part, $R_{ave}$: arithmetic mean calculated from the Ra, and $R_{sd}$: standard deviation calculated from the Ra.

The arithmetic mean roughness is evaluated by using a surface roughness meter (HANDYSURF E-35B manufactured by TOKYO SEIMITSU CO., LTD.) according to JIS-B-0601:2001 with a cut off value of 0.80 and an evaluation length of 4.0 mm to thereby determine the arithmetic mean roughness Ra (μm).

Next, method for determining the dispersion R is described by referring to FIG. 1. The faces defined by the bent parts are the 5 faces (a) to (e) constituting the fiber-reinforced composite material. First, the arithmetic mean roughness is measured for each of the faces (a) to (e) defined by the bent parts. Next, the arithmetic mean ($R_{ave}$) and the standard deviation ($R_{sd}$) are calculated by using the arithmetic mean roughness of these 5 faces, and by using these values, the dispersion R can be measured by using the expression (5).

When the dispersion R is 0 to 0.2, the fiber-reinforced composite material having the three-dimensional shape will have a homogeneous looking, and hence, a high quality appearance.

<Release Film (C)>

In the present invention, the release film (C) is preferably a polypropylene film.

The polypropylene which is preferable for use in the present invention may mainly comprise a homopolymer of the propylene (homopolypropylene), and this homopolymer may also contain a copolymerization component such as an unsaturated hydrocarbon blended therewith to the extent not adversely affecting the object of the present invention. Exemplary copolymerization components include α-olefins such as ethylene, 1-butene, and 1-pentene. In view of the strength of the release film (C), amount of the copolymerization component used is preferably less than 5% by mass. If desired, a polymer other the polypropylene or a filler may be incorporated to the extent not adversely affecting the advantageous effect of the present invention.

In the present invention, the release film (C) is either a multilayer film laminated in the order of the surface layer (I)/the substrate layer (II)/the surface layer (I) or a multilayer film laminated in the order of the surface layer (I)/the substrate layer (II), and the surface layer (I) is preferably a layer mainly containing polypropylene as its main component having a surface free energy of at least 15 mN/m and less than 28 mN/m.

It is to be noted that "the main component" as used in the present invention means that content of the particular component in the particular layer in the entire components of the particular layer is at least 50% by mass and up to 100% by mass. When the release film (C) is the multilayer film as described above, content of the polypropylene in the surface layer (I) is preferably at least 90% by mass and up to 100% by mass, more preferably at least 95% by mass and up to 100% by mass, and especially preferably at least 99% by mass and up to 100% by mass.

Also, in the present invention, the surface layer (I) is the layer containing a surface free energy of at least 15 mN/m and less than 28 mN/m located at the surface. In the present invention, the substrate layer (II) is a layer located in the interior or at the surface having a thickness equal to or higher than the surface layer (I).

When the release film (C) is the multilayer film as described above, the surface free energy of the surface layer (I) is more preferably at least 15 mN/m and less than 27 mN/m, still more preferably at least 15 mN/m and less than 26 mN/m, and especially preferably at least 15 mN/m and less than 25 mN/m. When the surface free energy is at least 28 mN/m, the release film (C) may become unpeelable from the surface of the fiber-reinforced composite material, and a mark may be left after the peeling. While releasability can be improved by reducing the surface free energy, the surface free energy can be reduced only to the limit of approximately 15 mN/m in the case of the polypropylene film. In the conventional art, the film surface free energy has been determined by the type of the polymer constituting the film, and in the case of the polypropylene film, the surface free energy was approximately 29 to 31 mN/m. While it has been possible to improve wettability by increasing the surface free energy using corona treatment or the like, improvement of releasability by reducing the surface free energy has been difficult. However, the present invention has enabled to control the surface free energy to the range as described above by precisely controlling the surface state by the method as described below.

When the release film (C) is the multilayer film as described above in the present invention, content of the polymethylpentene, fluorine resin, or silicone resin in the surface layer (I) is preferably less than 10% by mass, more preferably less than 1% by mass, still more preferably less than 0.1% by mass, and especially preferably none. The polymethylpentene, fluorine resin, and silicone resin are known to have excellent releasability since they have low surface free energy. Accordingly, use of these resins for the surface layer enables improvement in the releasability. These resins, however, suffer from low compatibility with polypropyrene, and their inclusion in the film surface layer may result in the insufficient dispersion and poor uniformity of the surface roughness, and the resulting fiber-reinforced composite material may suffer from poor quality of the appearance. Also, these resins are more expensive than polypropylene, and use of such resin may result in the increased cost of the starting materials.

In the present invention, the polypropylene preferable for use in the surface layer (I) are those having β crystal forming ability in view of forming a dense network structure comprising polypropylene fibrils in the surface layer (I). The β crystal forming ability in this case is preferably 30 to 100%. When the β crystal forming ability is less than 30%, formation of the fibril network structure in the film production will be difficult and excellent releasability may not be realized. In order to realize the β crystal forming ability in the range of 30 to 100%, use of a polypropylene having high isotactic index and addition of β crystal nucleating agent are preferable. The β crystal forming ability is more preferably 35 to 100%, and especially preferably 40 to 100%.

Exemplary β crystal nucleating agents include alkali metal or alkaline earth metal salts of a carboxylic acid such as calcium 1,2-hydroxystearate and magnesium succinate, amide compounds such as N,N'-dicyclohexyl-2,6-naphthalene dicarboxyamide, tetraoxaspiro compounds such as 3,9-bis[4-(N-cyclohexylcarbamoyl)phenyl]-2,4,8,10-tetraoxaspiro[5.5] undecane, aromatic sulfonic acid compound such as sodium benzenesulfonate and sodium naphthalenesulfonate, imide carboxylic acid derivatives, phthalocyanine pigments, and quinacridone pigments, and the especially preferred are amide compounds disclosed in Japanese Unexamined Patent Publication (Kokai) No. 5-310665. Content of the β crystal nucleating agent is preferably 0.05 to 0.5 parts by mass and more preferably 0.1 to 0.3 parts by mass when total of the polypropylene in the surface layer (I) is 100 parts by mass. When the content of the β crystal nucleating agent is less than 0.05 part by mass, the β crystal formation and the fibril network structure formation may become difficult and excellent releasability may not be realized. When the content is in excess of 0.5 part by mass, the excessively added β crystal nucleating agent may serve starting point of the defects.

In the present invention, the isotactic index of the polypropylene preferable for use in the surface layer (I) is preferably in the range of 90 to 99.9%, and more preferably 95 to 99%. When the isotactic index is less than 90%, crystallinity will be insufficient and the release film (C) may suffer from insufficient strength.

Examples of the polypropylene suitable for use for the surface layer (I) surely include homopolypropylene but also copolymer resins prepared by adding up to 5% by mass, and more preferably up to 2.5% by mass of ethylene component and other α-olefin component such as butene, hexene, or octene to the polypropylene in view of the stability in the film formation, film formation capability, and uniform physical properties.

In the present invention, the surface layer (I) of the release film (C) may preferably have an arithmetic mean roughness Ra of 200 to 1,000 nm, more preferably 300 to 950 nm, and still more preferably 400 to 900 nm. When Ra is 200 to 1,000 nm, surface irregularity of the surface layer (I) may be transferred to the fiber-reinforced composite material to give the surface with uniform matt texture, and such texture is useful for designed film. When Ra is less than 200 nm, surface irregularity of the surface layer (I) may not be transferred and the resulting product may not be able to serve a designed film while Ra in excess of 1,000 nm may invite rupture of the release film (C). In order to realize the Ra within such range, it would be effective to adjust the laminate constitution of the release film (C) and composition of the starting material of each layer within the range as described below, and also adjust the film formation conditions, and in particular, the extrusion and the stretching conditions within the ranges as described below.

In the present invention, the substrate layer (II) may preferably contain 100 parts by mass of the thermoplastic resin (D) and 1 to 20 parts by mass of the particulate filler (E). When the particulate filler (E) is less than 1 parts by mass, the surface roughening effects of the substrate layer (II) may not be realized, and the surface roughness of the release film (C) may become insufficient. When the particulate filler (E) in excess of 20 parts by mass, the release film (C) may become susceptible to rupturing.

In the present invention, the substrate layer (II) is preferably such that the proportion of the total of the thermoplastic resin (D) and the particulate filler (E) in 100% by mass of the entire components of the substrate layer (II) is preferably at least 50% by mass and up to 100% by mass, more preferably at least 90% by mass and up to 100% by mass, still more preferably at least 95% by mass and up to 100% by mass, and especially preferably at least 99% by mass and up to 100% by mass. When the proportion of the total of the thermoplastic resin (D) and the particulate filler (E) in 100% by mass of the entire components of the substrate layer (II) is less than 50% by mass, surface roughening effects of the substrate layer (II) may not be realized, and surface roughness of the release film (C) may become insufficient.

In the present invention, the thermoplastic resin (D) is not particularly limited, and the preferred is a polyolefin resin, and the more preferred is polypropylene. Use of the polypropylene for the thermoplastic resin (D) is preferable in view of improving the adhesion between the surface layer (I) and the substrate layer (II).

The polypropylene which is preferable for the thermoplastic resin (D) may mainly comprise a homopolymer of the propylene (homopolypropylene), and this homopolymer may also contain a copolymerization component such as an unsaturated hydrocarbon or another polymer (not the propylene homopolymer) blended therewith to the extent not adversely affecting the object of the present invention. Exemplary monomer components constituting such copolymer or blend include ethylene, propylene (in the case of copolymerized blend), 1-butene, 1-pentene, 3-methylpentene-1, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, 5-methyl-2-norbornene, and the like. With regard to the amount copolymerized or blended, the amount copolymerized is preferably less than 1 mol % and the amount blended is preferably less than 10 mol % in view of the strength of the release film (C).

The particulate filler (E) used may be inorganic particles or organic particles. Exemplary inorganic particles include metal oxides such as silica, alumina, titania, and zirconia, barium sulfate, calcium carbonate, aluminum silicate, calcium phosphate, mica, kaolin, and clay. Among these, the preferred are metal oxides such as silica, alumina, titania, and zirconia and calcium carbonate. Exemplary organic particles include crosslinked particles of a polymethoxysilane compound, crosslinked particles of a polystyrene compound, crosslinked particles of an acryl compound, crosslinked particles of polyurethane compound, crosslinked particles of a polyester compound, crosslinked particles of a fluorine compound, and mixtures thereof.

The particulate filler (E) may preferably have an average particle diameter in the range of 1 to 10 μm. The average particle diameter is more preferably 2 to 10 μm, still more preferably 3 to 10 μm, and especially preferably 4 to 10 μm. When the average particle diameter is less than 1 μm, the surface roughening effects of the substrate layer (II) may not be realized, and the surface roughness of the release film (C) may become insufficient. When the average particle diameter is in excess of 10 μm, the release film (C) may become susceptible to rupturing. The average particle diameter may be measured by taking image of the particles with a transmission electron microscope and conducting image processing of the particle image to obtain the circle corresponding to the particle and calculating the weight average diameter by using the diameter of such circle.

In the present invention, proportion of the total thickness of the surface layers (I) in the entire thickness of the release film (C) is preferably up to 25%, more preferably up to 20%, still more preferably up to 15%, and especially preferably up to 10%. The total thickness of the surface layers (I) is total of the thickness of the surface layers (I) on opposite surfaces in the case of the multilayer film prepared by the lamination in the order of the surface layer (I)/the substrate layer (II)/the surface layer (I). When the proportion of the surface layer (I) is in excess of 25%, the surface roughening effects of the substrate layer (II) may not be realized. When the proportion of the surface layer (I) is less than 1%, the particulate filler (E) in the substrate layer (II) may protrude from the surface layer (I) to be exposed on the surface, thereby increasing the surface free energy, and accordingly, the proportion of the surface layer (I) is preferably at least 1%.

Next, a preferred embodiment of the method for producing the release film (C) in the present invention is described, which by no means limit the scope of the invention.

In the present invention, the direction parallel to the direction of the formation of the release film (C) is referred to as MD, and the direction parallel to the direction in the face of the release film (C) perpendicular to the film formation direction is referred to as TD.

First, the polymer starting material are fed to the single screw extruder for the surface layer (I) and the single screw extruder for the substrate layer (II), and melt extrusion is conducted at 200 to 260° C. After removing foreign objects, modified polymers, and the like by a filter installed at some point in the polymer tube, the polymers are laminated by using a multi-manifold-type composite T die (the surface layer (I)/the substrate layer (II)/the surface layer (I)) at a lamination thickness ratio of, for example, 1/8/1 and ejected onto a casting drum to obtain a unstretched laminate sheet having a layer structure of the surface layer (I)/the substrate layer (II)/the surface layer (I). In this process, the surface temperature of the casting drum is preferably 30 to 130° C. Exemplary techniques used for adhesion to the casting drum include electrostatic technique, adhesion using the surface tension of water, air knife technique, press roll technique, submerged casting, and the like, and in view of planarity, the preferred is the air knife technique. The air temperature of the air knife is 25 to 100° C. and preferably 30 to 80° C., and the blown air speed is preferably 130 to 150 m/s. To improve uniformity in TD direction, use of a double tube structure is preferred. To prevent the film from vibrating, the position of the air knife is adequately adjusted so that the air flows toward the downstream side of the film formation.

The resulting unstretched sheet is allowed to cool in the air and then introduced into the longitudinal stretching step. In the longitudinal stretching step, the unstretched sheet is first brought in contact with a plurality of metallic rolls maintained at 100° C. or more and less than 150° C. for preliminary heating, and after stretching 3 to 8 fold in MD direction, the sheet is cooled to room temperature. Stretching at a temperature in excess of 150° C. may result in the unevenness or rupture during the stretching. The stretch ratio of less than threefold may result in the unevenness during stretching, and orientation of the film may become insufficient to result in the poor tensile rigidity.

Next, the longitudinally and uniaxially stretched film is guided to a tenter where the film edges are gripped by clips, and the film is stretched in TD direction at a temperature of 120 to 165° C. at a stretching ratio of 7 to 13. When the stretching temperature is low, the film may become susceptible to rupturing while excessively high stretching temperature may result in the loss of film rigidity. When the stretching ratio is too high, the film may also become susceptible to rupturing while low stretching ratio may invite insufficient film orientation and poor tensile rigidity.

In the subsequent step of heat treatment and relaxing treatment, the film is thermally fixed at a temperature of at least 100° C. and less than 160° C. with tension applied in TD direction by the clips gripping the film at a relaxation ratio in TD direction of 2 to 20%. After the cooling process at 80 to 100° C., the film is guided outside of the tenter, and the edges of the film are released from the clips. The film edges are slit in the winder step, and a film product roll is wound.

<Thermosetting Resin (B)>

The thermosetting resin (B) in the fiber-reinforced substrate is not particularly limited in the present invention. However, the preferred is an epoxy resin in view of its efficient molding cycle and mechanical properties of the resulting fiber-reinforced composite material.

The epoxy resin used in the present invention is not particularly limited as long as it is a compound having 2 or more epoxy groups in the compound, and exemplary epoxy resins include bisphenol A epoxy resin, bisphenol F epoxy resin, bisphenol S epoxy resin, novolac epoxy resin, naphthalene epoxy resin, novolac epoxy resin, an epoxy resin having fluorene skeleton, an epoxy resin produced from a copolymer of a phenol compound and s dicyclopentadiene, a glycidyl ether epoxy resin composition such as diglycidyl-resorcinol, tetrakis(glycidyloxyphenyl)ethane, and tris(glycidyloxy phenyl)methane, a glycidyl amine epoxy resin such as tetraglycidyl diaminodiphenylmethane, triglycidylaminophenol, triglycidylaminocresol, and tetraglycidylxylenediamine, biphenyl epoxy resin, isocyanate modified epoxy resin, and mixtures thereof which may be used alone or in combination. When the composite material should have well-balanced heat resistance and mechanical properties, the preferred is use of a combination of a polyfunctional epoxy resin with a difunctional epoxy resin, for example, the combination of a phenol novolac epoxy resin (the polyfunctional epoxy resin) and a bisphenol A epoxy resin or a bisphenol F epoxy resin (the difunctional epoxy resin).

When an epoxy resin is used for the thermosetting resin (B) of the present invention, the curing agent used is preferably an amine curing agent, which is a curing agent containing nitrogen atom in the curing agent molecule. Such curing agent is not particularly limited as long as the nitrogen atom is present in the molecule, and examples include aromatic polyamine compounds including active hydrogen such as 4,4'-diaminodiphenylmethane, 4,4'-diaminodiphenylsulfone, 3,3'-diaminodiphenylsulfone, m-phenylenediamine, m-xylylenediamine, and diethyl toluenediamine; aliphatic amine including active hydrogen such as diethylenetriamine, triethylenetetramine, isophoronediamine, bis(aminomethyl)norbornane, bis(4-aminocyclohexyl)methane, and dimer acid ester of polyethyleneimine; modified amines obtained by reacting such amine including active hydrogen with a compound such as epoxy compound, acrylonitrile, phenol and formaldehyde, and thiourea; tertiary amine having no active hydrogen such as dimethylaniline, dimethylbenzylamine, 2,4,6-tris(dimethylaminomethyl)phenol, and mono-substituted imidazole; dicyandiamide; tetramethylguanidine; polycarboxylic acid hydrazides such as adipic acid hydrazide, and naphthalene dicarboxylic acid hydrazide; and Lewis acid complex such as ethylamine boron trifluoride complex.

These curing agent may be used in combination with an adequate curing aid in order to improve the curing activity. For example, dicyandiamide may be combined with a curing aid such as a urea derivative, for example, 3-phenyl-1,1-dimethylurea, 3-(3,4-dichlorophenyl)-1,1-dimethylurea (DCMU), 3-(3-chloro-4-methylphenyl)-1,1-dimethylurea, or 2,4-bis(3,3-dimethylureido)toluene, or an imidazole derivative. While a temperature of approximately 170 to 180° C. is required for the curing in the case of dicyandiamide alone, the resin composition using such combination is curable at approximately 80 to 150° C. The especially preferred is combination of dicyandiamide and a compound having at least 2 urea bonds in one molecule, and examples of such compound having at least 2 urea bonds in one molecule include 1,1'-4(methyl-m-phenylene)bis(3,3-dimethylurea) and 4,4'-methylenebis(phenyldimethylurea). Use of such compound enables curing at 150 to 160° C. in 2 to 10 minutes.

Another example is use of an aromatic amine in combination with the ethylamine boron trifluoride complex for the curing aid.

For the application where curability at lower temperature is required, use of a latent curing agent which is activated at 70 to 125° C. is preferable. In this context, "activated at 70 to 125° C." means that the reaction initiation temperature is in the range of 70 to 125° C. The reaction initiation temperature (hereinafter referred to as activation temperature) can be determined by means of differential scanning calorimetry (DSC). More specifically, an epoxy resin composition prepared by adding 10 parts by mass of the curing agent to be evaluated to 100 parts by mass of a bisphenol A epoxy resin having an epoxy equivalent weight of approximately 184 to 194 is subjected to differential scanning calorimetry, and the activation temperature can be determined from intersecting point of the tangent at the inflexion point of the resulting exothermic curve and the tangent of the base line. When the activation temperature is less than 70° C., storage stability may be insufficient, and the expected fast curability may not be realized when activation temperature is in excess of 125° C.

The latent curing agent activated at 70 to 125° C. is not particularly limited as long as it has such activation temperature, and examples include amine adduct latent curing agent, microcapsule latent curing agent, aminimide, blocked isocyanate, a compound prepared by reacting epoxy group with carbamate ester to form an oxazolidinone ring, carboxylic acid blocked by vinyl ether, salt of imidazole with a carboxylic acid, amine carbamate, and onium salt.

The amine adduct latent curing agent is produced by reacting an active component such as a compound having primary, secondary, or tertiary amino group or an imidazole compound with a compound capable of undergoing a reaction with such compound to increase the molecular weight of the active component so that it does not melt at the storage temperature. Exemplary amine adduct latent curing agents include "Amicure" (Registered Trademark) PN-23 and MY-24 (manufactured by Ajinomoto Fine-Techno Co., Inc.), "ADEKA hardener" (Registered Trademark) EH-3293S, EH-3615S, and EH-4070S (manufactured by ADEKA CORPORATION), and "Fujicure" (Registered Trademark) FXE1000 and FXR-1020 (manufactured by Fuji Chemical Industry Co., Ltd.) and exemplary microcapsule latent curing agents include "Novacure" (Registered Trademark)

HX-3721 and HX-3722 (manufactured by Asahi Kasei Corporation). Of these, use of the amine adduct latent curing agent such as "Amicure" PN-23 is particularly preferable in view of their excellent storage stability at room temperature and significant fast curability.

The microcapsule latent curing agent is a latent curing agent produced by using a curing agent for the nucleus and coating this nucleus with a high molecular weight substance such as epoxy resin, polyurethane resin, polystyrene, or polyimide or cyclodextrin for the shell to thereby reduce the contact between the epoxy resin and the curing agent.

When a latent curing agent which becomes active at 70 to 125° C. is combined with a particular type of curing agent, fast curing at lower temperature is enabled. For example, a curing agent system prepared by combining a latent curing agent such as "Amicure" PN-23 with an organic acid dihydrazide such as vanadic acid dihydrazide and a curing agent system prepared by combining a latent curing agent with a curing aid such as DCMU is preferable for use since thy can cured at 110° C. for about 10 minutes.

<Reinforcing Fiber (A)>

In the present invention, the reinforcing fiber (A) in the fiber-reinforced substrate is not particularly limited, and the preferred is carbon fiber in view of the lightness and mechanical properties of the resulting fiber-reinforced composite material.

Exemplary carbon fibers that may be used include polyacrylonitrile (PAN) carbon fibers, pitch carbon fibers, and rayon carbon fibers, which may be used alone or in combination of two or more. Of these, the preferred in view of the high quality appearance and the mechanical properties of the resulting fiber-reinforced composite material is PAN carbon fibers.

The reinforcing fiber (A) may preferably have a monofilament diameter of at least 0.5 μm, more preferably at least 2 μm, and especially preferably at least 4 μm. In addition, the reinforcing fiber (A) may preferably have a monofilament diameter of up to 20 μm, more preferably up to 15 μm, and especially preferably up to 10 μm.

<Fiber-Reinforced Substrate>

In the present invention, the fiber-reinforced substrate is not particularly limited as long as it contains the reinforcing fiber (A) and the thermosetting resin (B). Use of a prepreg containing the reinforcing fiber (A) and the thermosetting resin (B) is preferable, and in such a case, use of a laminate comprising at least two prepregs each containing the reinforcing fiber (A) and the thermosetting resin (B) is preferable.

In the present invention, the reinforcing fiber (A) in the prepreg is not limited for the morphology and arrangement, and exemplary morphology and arrangement include fiber structures such as long fibers aligned in one direction and woven, knitted, or non-woven fabrics. The especially preferred is the unidirectional prepreg containing the long fibers aligned in one direction due to its high utilization of the fiber strength in the direction of the fiber owing to the single direction of the reinforcing fiber (A). Use of the unidirectional prepreg is particularly preferable since modulus and strength of the fiber-reinforced composite material in various directions can be freely controlled by laminating two or more prepregs in an adequate laminate constitution and then conducting the molding.

The prepreg may be produced by wet method wherein impregnation of the thermosetting resin (B) is accomplished by reducing its viscosity by dissolution in a solvent such as methyl ethyl ketone or methanol or by hot melting method wherein the viscosity is reduced by heating.

More specifically, the wet method is a method wherein the reinforcing fiber (A) is immersed in a solution of the thermosetting resin (B), and after taking out from the solution, the solvent is evaporated by an oven or the like to obtain the prepreg.

The hot melting method is a method wherein the thermosetting resin (B) is heated to reduce the viscosity and the reinforcing fiber (A) is directly impregnated with the thermosetting resin (B); or a method wherein the thermosetting resin (B) is coated on a release paper or the like to prepare a film of the thermosetting resin (B), and after laminating this film of the thermosetting resin (B) on both sides or on one side of the reinforcing fiber (A), the thermosetting resin (B) is impregnated in the reinforcing fiber (A) by applying heat and pressure to obtain the prepreg.

The mechanical properties and the formability of the resulting fiber-reinforced composite material are largely dependent on the amount of the reinforcing fiber (A). More specifically, when the fiber-reinforced composite material contains a certain amount of the reinforcing fiber (A), the fiber-reinforced composite material will enjoy improved mechanical properties while it will suffer from poor formability when the amount of the thermosetting resin (B) used in combination with the reinforcing fiber (A) is reduced. Accordingly, in the present invention, content of the reinforcing fiber (A) in relation to 100% by mass of the total mass of the fiber-reinforced substrate or 100% by mass of total mass of the fiber-reinforced composite material is preferably 30 to 95% by mass, more preferably 50 to 90% by mass, still more preferably 60 to 80% by mass. When the content of the reinforcing fiber (A) is less than 30% by mass, the fiber-reinforced composite material may suffer from insufficient mechanical properties, and the content in excess of 95% by mass may result in the poor formability.

<Fiber-Reinforced Composite Material>

In the present invention, the fiber-reinforced composite material is produced by sandwiching a fiber-reinforced substrate containing a reinforcing fiber (A) and a thermosetting resin (B) between release films (C) to constitute a layered material, and pressing the layered material in a mold heated to molding temperature to thereby cure the thermosetting resin (B). Examples of the method for sandwiching the fiber-reinforced substrate with the release films (C) to obtain the layered materials include a method wherein 2 release films (C) are prepared, and these 2 release films (C) are respectively disposed on both surfaces of the fiber-reinforced substrate for lamination; a method using 1 large release film (C) wherein 1 large release film (C) is prepared, the fiber-reinforced substrate is disposed on the large release film (C), and the part of the large release film (C) where the fiber-reinforced substrate is not disposed is folded back to sandwich the fiber-reinforced substrate with 1 release film (C); and a method wherein at least 2 prepregs are laminated on the release film (C) to form the fiber-reinforced substrate and another release film (C) is laminated on this fiber-reinforced substrate to thereby accomplish the sandwiching by using 2 release films (C). The fiber-reinforced composite material can be formed at a high cycle by preliminarily preparing the layered material and repeating the steps of placing this layered material in the mold to press the layered material and removing of the pressed layered material from the mold.

With regard to the method used for placing the layered material in the mold and pressing the layered material, the preferred is use of press molding.

In the method for producing the fiber-reinforced composite material of the present invention, the pressure in the pressure application is preferably 0.1 to 10 MPa, more preferably 0.1 to 5 MPa, and still more preferably 0.2 to 3 MPa. Use of such pressure range in the pressure application is preferable in view of producing a fiber-reinforced composite material having a high quality appearance.

EXAMPLES

Next, the present invention is described in further detail by referring to the following Examples.

The evaluation methods used in the present invention are as described below.

(1) Measurement of Thermal Contraction Rate

For release film (C), contraction curve under a constant load in MD and TD directions was determined by using thermomechanical analyzer (TMA/SS6000: manufactured by Seiko Instruments Inc.) according to the following temperature program. The thermal contraction rate at the predetermined temperature was read from the resulting contraction curve.

Temperature program: 30° C.→(5° C./minute)→180° C.

Load: 2 gf

Sample size: 15 mm (sample length)×4 mm (sample width) (The sample was placed so that the direction to be measured would be the direction of the sample length).

(2) Measurement of Hardness

The release film (C) and the fiber-reinforced substrate were evaluated for their hardness at each temperature by using a durometer corresponding to JIS-K-7215:1986, type A. More specifically, the release film (C) or the fiber-reinforced substrate was used for the sample, and after placing the sample on the metal plate which had been heated to the desired temperature for 30 seconds, the hardness was measured for use as the hardness at each temperature.

(3) Evaluation of Quality of the Appearance

The resulting fiber-reinforced composite materials were evaluated for their quality of the appearance by the 3 grades as described below. Those with the evaluation of "good" were acceptable.

good: no appearance failure in the form of creases was found in the bent parts and faces of the fiber-reinforced composite material, bad: appearance failure in the form of creases was found in the bent parts and no such failure was found in the faces of the fiber-reinforced composite material, and worse: appearance failure in the form of creases was found both in the bent parts and in the faces of the fiber-reinforced composite material.

(4) Evaluation of Dispersion of the Arithmetic Mean Roughness

In the fiber-reinforced composite material, the arithmetic mean roughness was evaluated by using a surface roughness meter (HANDYSURF E-35B manufactured by TOKYO SEIMITSU CO., LTD.) according to JIS-B-0601:2001 with cut off value of 0.80 and evaluation length of 4.0 mm to thereby determine the arithmetic mean roughness Ra (μm). The arithmetic mean roughness was measured by measuring the surface roughness for each face defined by the bent parts and then calculating arithmetic mean ($R_{ave}$) and standard deviation ($R_{sd}$) by using the thus obtained measurements. The dispersion R was then calculated by expression (5) using the $R_{ave}$ and the $R_{sd}$.

$$R = R_{sd}/R_{ave} \quad \text{expression (5)}$$

(5) Measurement of Surface Free Energy of the Release Film (C)

4 types of liquids, namely, water, ethylene glycol, formamide, and methylene iodide were used for the measurement, and static contact angle of each liquid with the film surface was determined by using contact angle meter Model CA-D manufactured by Kyowa Interface Science Co., Ltd. The static contact angle was measured 30 seconds after the dropping of each liquid to the film surface. The component of the contact angle determined for each liquid and the component of the surface tension of the liquid used for the measurement were substituted into the following equations, and the simultaneous equation comprising 4 equations was solved for γSd, γSp, and γSh.

$$(\gamma Sd \cdot \gamma Ld)1/2 + (\gamma Sp \cdot \gamma Lp)1/2 + (\gamma Sh \cdot \gamma Lh)1/2 = \gamma L(1+\cos\theta)/2$$

with the proviso γS=γSd+γSp+γSh

γL=γLd+γLp+γLh wherein γS, γSd, γSp, and γSh respectively represent the surface free energy, the dispersion force component of the film surface, the polarity force component, and the hydrogen bond component, and γL, γLd, γLp, and γLh respectively represent the surface free energy, the dispersion force component, the polarity force component, and the hydrogen bond component of the liquid used for the measurement. Surface tension of each liquid used was the value proposed by Panzer (J. Panzer, J. Colloid Interface Sci., 44, 142 (1973)).

Reference Example 1

The starting material for the substrate layer (II) was prepared by dry-blending 85 parts by mass of a crystalline PP (the polypropylene is hereinafter abbreviated as PP) (TF850H manufactured by Prime Polymer Co., Ltd. having a MFR of 2.9 g/10 minutes and an isotactic index of 96%) and 15 parts by mass of master raw material (2480K manufactured by Sankyo Seifun Co. Ltd.; calcium carbonate particles, 6 μm) obtained by compounding 80% by mass of calcium carbonate and 20% by mass of polypropylene. This starting material for the substrate layer (II) was fed to a single screw melt extruder for the substrate layer (II). In the meanwhile, crystalline PP (TF850H manufactured by Prime Polymer having a MFR of 2.9 g/10 minutes and an isotactic index of 96%) which was the starting material for the surface layer (I) was fed to a single screw melt extruder for the surface layer (I). Melt extrusion was conducted at 240° C. After removing foreign objects by a 60 μm cutoff sintered filter, the materials were laminated in the thickness ratio of 1/58/1 by using a feed block-type composite T die for 3 layer lamination (surface layer (I)/substrate layer (II)/surface layer (I)) and ejected onto a casting drum with the surface temperature controlled to 30° C. to thereby obtain a cast sheet. Next, the film was preliminarily heated at 125° C. using a plurality of ceramic rolls and stretched 4.6-fold in the MD direction of the film. Next, the film was introduced in a tenter-type stretching machine with its edges gripped by clips, and after preliminarily heating for 3 seconds at 165° C., the film was stretched 8.0-fold at 160° C. In the subsequent heat treatment step, the film was subjected to the heat treatment at 160° C. while relaxing the film to 10% in the TD direction, and after conducting the cooling step at 130° C., the film was guided to the exterior of the tenter. The clips at the edge of the film were opened, and the film was wound around a core to obtain a polypropylene film having a thickness of 30 µm. The resulting polypropylene film had a surface free energy of 26.5 mN/m and an arithmetic mean roughness Ra of 430 nm.

Reference Example 2

The starting material for the substrate layer (II) was prepared by dry-blending 93.3 parts by mass of a crystalline PP (TF850H manufactured by Prime Polymer Co., Ltd. having a MFR of 2.9 g/10 minutes and an isotactic index of 96%) and 6.7 parts by mass of master material (2480K manufactured by Sankyo Seifun Co. Ltd.; calcium carbonate particles, 6 µm) obtained by compounding 80% by mass of calcium carbonate and 20% by mass of polypropylene. This starting material for the substrate layer (II) was fed to a single screw melt extruder for the substrate layer (II). In the meanwhile, crystalline PP (TF850H manufactured by Prime Polymer having a MFR of 2.9 g/10 minutes and an isotactic index of 96%) which was the starting material for the surface layer (I) was fed to a single screw melt extruder for the surface layer (I). Melt extrusion was conducted at 240° C. After removing foreign objects by a 60 µm cutoff sintered filter, the materials were laminated in the thickness ratio of 8/1 by using a feed block-type composite T die (substrate layer (II)/surface layer (I)) and ejected onto a casting drum with the surface temperature controlled to 30° C. to thereby obtain a cast sheet. In this process, the substrate layer (II) was the surface that was brought in contact with the casting drum. Next, the film was preliminarily heated at 125° C. using a plurality of ceramic rolls and stretched 4.6-fold in the MD direction of the film. Next, the film was introduced in a tenter-type stretching machine with its edges gripped by clips, and after preliminarily heating for 3 seconds at 165° C., the film was stretched 8.0-fold at 160° C. In the subsequent heat treatment step, the film was subjected to the heat treatment at 160° C. while relaxing the film to 0% in the TD direction, and after conducting the cooling step at 130° C., the film was guided to the exterior of the tenter. The clips at the edge of the film were opened, and the film was wound around a core to obtain a polypropylene film having a thickness of 19 µm. The resulting polypropylene film had a surface free energy of the surface layer (I) of 25.3 mN/m and an arithmetic mean roughness Ra of the surface layer (I) of 255 nm.

Reference Example 3

Polyvinyl fluoride resin film "Tedlar" (Registered Trademark) TTR20SG4 was used as a commercially available film. The film had a thickness of 50 µm and an arithmetic mean roughness of 100 nm. The film was transparent with no recognizable fillers.

Reference Example 4

20 parts by mass of "Epikote" 828, 20 parts by mass of "Epikote" 834, and 25 parts by mass of "Epikote" 1001 (bisphenol A epoxy resins manufactured by Japan Epoxy Resins Co., Ltd.) and 35 parts by mass of "Epikote" 154 (phenol novolac epoxy resin manufactured by Japan Epoxy Resins Co., Ltd.) as the thermosetting resin (B); 4 parts by mass of DICY7 (dicyandiamide, manufactured by Japan Epoxy Resins Co., Ltd.) as the amine curing agent; 3 parts by mass of "Nova Red" 120 (Registered Trademark; average particle size, 25 µm; phosphorus content, 85%) as the phosphorus compound; 5 parts by mass of "Omicure" (Registered Trademark) 24 (2,4-toluene bis (dimethylurea) as the curing aid; 5 parts by mass of "Vinylec" K (Registered Trademark) (polyvinyl formal manufactured by Chisso Corporation) as the thermoplastic resin were mixed in a kneader by the procedure as described below to obtain an epoxy resin composition having the polyvinyl formal homogeneously dissolved therein.

First, the epoxy resin materials and the polyvinyl formal were heated to 150 to 190° C. with stirring for 1 to 3 hours to homogeneously dissolve the polyvinyl formal. Next, the resin temperature was decreased to 90° C. to 110° C., and after adding the phosphorus compound, the stirring was continued for 20 to 40 minutes. The resin temperature was then decreased to 55 to 65° C., and after adding the dicyandiamide and the 3-(3,4-dichlorophenyl)-1,1-dimethylurea, the stirring was continued at the same temperature for 30 to 40 minutes. After the kneading, the resin was taken out of the kneader to obtain the epoxy resin composition.

Reference Example 5

The epoxy resin composition prepared in Reference Example 4 was coated on a release paper by using a reverse roll coater to prepare an epoxy resin film. Resin amount per unit area of the epoxy resin film was 25 g/m$^2$.

Next, carbon fibers "TORAYCA" (Registered Trademark) T700SC-12K-50C (manufactured by Toray Industries, Inc.) were unidirectionally aligned in the sheet form so that fiber mass per unit area was 100 g/m$^2$ and the epoxy resin film was overlaid on both surfaces of the carbon fiber sheet. The resin composition was impregnated by applying heat and pressure to thereby prepare a prepreg.

Reference Example 6

The prepregs prepared in Reference Example 5 was laminated in the constitution of [0/90]2s to obtain a fiber-reinforced substrate having a thickness of 0.8 mm.

Example 1

The fiber-reinforced substrate obtained in Reference Example 6 was sandwiched between 2 release films (C) obtained in Reference Example 1 to prepared a layered material, and this layered material was placed in a mold which had been heated to a molding temperature of 150° C. for molding under the conditions of pressure application time of 5 minutes and pressure of 2 MPa to thereby prepare a fiber-reinforced composite material. The mold used was the one having a product cavity of 0.8 mm thick in the shape of a box (the shape of FIG. 1 wherein the faces (a) and (c) are rectangles of 10 mm×100 mm, faces (b) and (d) are rectangles of 10 mm×200 mm, face (e) is a rectangle of 100 mm×200 mm, and the radius of curvature of each bent part was 5 mm). The thermal contraction rate of the release film and the evaluation results of the molded article are shown in Table 1 and the hardness of the release film and the evaluation results of the molded article are shown in Table 2.

Example 2

The molding was conducted by repeating the procedure of Example 1 except that the molding temperature was changed to 140° C. to produce the fiber-reinforced composite material. The molding conditions and the evaluation results are shown in Table 1.

Comparative Example 1

The molding was conducted by repeating the procedure of Example 1 except that the molding temperature was changed to 120° C. to produce the fiber-reinforced composite material. The thermal contraction rate of the release film and the evaluation results of the molded article are shown in Table 1 and the hardness of the release film and the evaluation results of the molded article are shown in Table 2.

Example 3

The molding was conducted by repeating the procedure of Example 1 except that the film of the Reference Example 2 was used for the release film (C), and the layered material was formed so that the surface layer (I) of the film of the Reference Example 2 would be on the side of the fiber-reinforced substrate to produce the fiber-reinforced composite material. The thermal contraction rate of the release film and the evaluation results of the molded article are shown in Table 1 and the hardness of the release film and the evaluation results of the molded article are shown in Table 2.

Example 4

The molding was conducted by repeating the procedure of Example 3 except that the molding temperature was changed to 140° C. to produce the fiber-reinforced composite material. The molding conditions and the evaluation results are shown in Table 1.

Comparative Example 2

The molding was conducted by repeating the procedure of Example 3 except that the molding temperature was changed to 120° C. to produce the fiber-reinforced composite material. The thermal contraction rate of the release film and the evaluation results of the molded article are shown in Table 1 and the hardness of the release film and the evaluation results of the molded article are shown in Table 2.

Comparative Example 3

The molding was conducted by repeating the procedure of Example 1 except that the film of the Reference Example 3 was used for the release film (C), and the layered material was formed by sandwiching the fiber-reinforced substrate with 2 films of the Reference Example 3 to produce the fiber-reinforced composite material. The thermal contraction rate of the release film and the evaluation results of the molded article are shown in Table 1 and the hardness of the release film and the evaluation results of the molded article are shown in Table 2.

Comparative Example 4

The molding was conducted by repeating the procedure of Comparative Example 3 except that the molding temperature was changed to 140° C. to produce the fiber-reinforced composite material. The molding conditions and the evaluation results are shown in Table 1.

Comparative Example 5

The molding was conducted by repeating the procedure of Comparative Example 3 except that the molding temperature was changed to 120° C. to produce the fiber-reinforced composite material. The thermal contraction rate of the release film and the evaluation results of the molded article are shown in Table 1 and the hardness of the release film and the evaluation results of the molded article are shown in Table 2.

TABLE 1

|  |  | Ex. 1 | Ex. 2 | Comp. Ex. 1 | Ex. 3 | Ex. 4 | Comp. Ex. 2 | Comp. Ex. 3 | Comp. Ex. 4 | Comp. Ex. 5 |
|---|---|---|---|---|---|---|---|---|---|---|
| (Molding conditions) | | | | | | | | | | |
| Molding temperature | ° C. | 150 | 140 | 120 | 150 | 140 | 120 | 150 | 140 | 120 |
| Pressure application time | min. | 5 | 5 | 5 | 5 | 5 | 5 | 5 | 5 | 5 |
| Pressure applied | MPa | 2 | 2 | 2 | 2 | 2 | 2 | 2 | 2 | 2 |
| Release film | — | Ref. Ex. 1 | Ref. Ex. 1 | Ref. Ex. 1 | Ref. Ex. 2 | Ref. Ex. 2 | Ref. Ex. 2 | Ref. Ex. 3 | Ref. Ex. 3 | Ref. Ex. 3 |
| (Properties in MD direction of the release film) | | | | | | | | | | |
| Ta | % | 2.2 | 0.3 | −0.5 | 5.6 | 3.2 | 1.2 | −0.1 | −0.2 | −0.5 |
| Tb | % | −0.5 | −0.8 | −0.8 | 1.7 | 1.3 | 0.5 | −0.5 | −0.6 | −0.5 |
| Ta − Tb | % | 2.7 | 1.1 | 0.3 | 3.9 | 1.9 | 0.7 | 0.5 | 0.4 | 0 |
| (Properties in TD direction of the release film) | | | | | | | | | | |
| Ta | % | 6.3 | 1.6 | −0.3 | 19.6 | 10.3 | 3.5 | −1 | −1.4 | −1.4 |
| Tb | % | −0.3 | −0.5 | −0.4 | 3.5 | 1.9 | 0.5 | −1.4 | −1.3 | −1.1 |
| Ta − Tb | % | 6.6 | 2.1 | 0.1 | 16.1 | 8.4 | 3 | 0.4 | −0.1 | −0.3 |
| (Fiber-reinforced composite material) | | | | | | | | | | |
| Evaluation of the appearance quality | — | good | good | bad | good | good | bad | bad | worse | worse |
| Dispersion R | — | 0.1 | 0.1 | 0.1 | 0.1 | 0.1 | 0.1 | 0.3 | 0.3 | 0.4 |

Examples and Comparative Examples in Table 1 demonstrate the situations as described below.

Since Examples 1 to 4 satisfy (i), (ii), and (iii), the resulting fiber-reinforced composite materials are clearly those having a three-dimensional shape with high quality appearance.

As apparent from the comparison of Examples 1 and 2 with Comparative Example 1, the resulting fiber-reinforced composite materials having the three-dimensional shape suffer from poor quality appearance when (ii) and (iii) are not satisfied.

As apparent from the comparison of Examples 3 and 4 with Comparative Example 2, the resulting fiber-reinforced composite materials having the three-dimensional shape suffer from poor quality appearance when (ii) and (iii) are not satisfied.

As apparent from the comparison of Examples 1 and 3 with Comparative Example 3, the resulting fiber-reinforced composite materials having the three-dimensional shape suffer from poor quality appearance when (iii) is not satisfied.

Example 5

The molding was conducted by repeating the procedure of Example 1 except that the molding temperature was changed to 160° C. to produce the fiber-reinforced composite material. The hardness of the release film and the evaluation results of the molded article are shown in Table 2.

Example 6

The molding was conducted by repeating the procedure of Example 3 except that the molding temperature was changed to 160° C. to produce the fiber-reinforced composite material. The hardness of the release film and the evaluation results of the molded article are shown in Table 2.

Comparative Example 6

The molding was conducted by repeating the procedure of Comparative Example 8 except that the molding temperature was changed to 160° C. to produce the fiber-reinforced composite material. The hardness of the release film and the evaluation results of the molded article are shown in Table 2.

composite materials having the three-dimensional shape suffer from poor quality appearance when (ii) and (iv) are not satisfied.

As apparent from the comparison of Examples 3 and 6 with Comparative Example 2, the resulting fiber-reinforced composite materials having the three-dimensional shape suffer from poor quality appearance when (ii) and (iv) are not satisfied.

As apparent from the comparison of Examples 1 and 3 with Comparative Example 3, the resulting fiber-reinforced composite materials having the three-dimensional shape suffer from poor quality appearance when (iv) is not satisfied.

INDUSTRIAL APPLICABILITY

The present invention has enabled to suppress the problem of poor appearance caused by the release film in the production of the fiber-reinforced composite material having a three-dimensional shape by heat-press molding. The present invention has also enabled to produce a fiber-reinforced composite material having a high quality appearance in high cycle. Accordingly, the fiber-reinforced composite material obtained in the present invention is well adapted for use in structural members of an aircraft, automobile, or ship, housing of electronic device, sports applications, building materials, and other industrial materials.

EXPLANATION OF THE NUMERALS 1 fiber-reinforced composite material having a three-dimensional shape
2 radius of curvature in the rounded section of the bent part
3 bent part
4 face
5 apex

TABLE 2

|  |  | Ex. 1 | Ex. 5 | Comp. Ex. 1 | Ex. 3 | Ex. 6 | Comp. Ex. 2 | Comp. Ex. 3 | Comp. Ex. 6 | Comp. Ex. 5 |
|---|---|---|---|---|---|---|---|---|---|---|
| (Molding conditions) | | | | | | | | | | |
| Molding temperature | ° C. | 150 | 160 | 120 | 150 | 160 | 120 | 150 | 160 | 120 |
| Pressure application time | min. | 5 | 5 | 5 | 5 | 5 | 5 | 5 | 5 | 5 |
| Pressure applied | MPa | 2 | 2 | 2 | 2 | 2 | 2 | 2 | 2 | 2 |
| Release film | — | Ref. Ex. 1 | Ref. Ex. 1 | Ref. Ex. 1 | Ref. Ex. 2 | Ref. Ex. 2 | Ref. Ex. 2 | Ref. Ex. 3 | Ref. Ex. 3 | Ref. Ex. 3 |
| (Properties of the release film) | | | | | | | | | | |
| Hrc | — | 95 | 95 | 95 | 95 | 95 | 95 | 95 | 95 | 95 |
| Hrf | — | 90 | 90 | 90 | 90 | 90 | 90 | 90 | 90 | 90 |
| Hrc/Hrf | — | 1.1 | 1.1 | 1.1 | 1.1 | 1.1 | 1.1 | 1.1 | 1.1 | 1.1 |
| Hhc | — | 85 | 70 | 95 | 75 | 65 | 95 | 95 | 95 | 95 |
| Hhf | — | 60 | 60 | 60 | 60 | 60 | 60 | 60 | 60 | 60 |
| Hhc/Hhf | — | 1.4 | 1.2 | 1.6 | 1.3 | 1.1 | 1.6 | 1.6 | 1.6 | 1.6 |
| (Fiber-reinforced composite material) | | | | | | | | | | |
| Evaluation of the appearance quality | — | good | good | bad | good | good | bad | bad | worse | worse |
| Dispersion R | — | 0.1 | 0.1 | 0.1 | 0.1 | 0.1 | 0.1 | 0.3 | 0.3 | 0.4 |

Examples and Comparative Examples in Table 2 demonstrate the situations as described below.

Since Examples 1, 3, 5, and 6 satisfy (i), (ii), and (iv), the resulting fiber-reinforced composite materials are clearly those having a three-dimensional shape with high quality appearance.

As apparent from the comparison of Examples 1 and 5 with Comparative Example 1, the resulting fiber-reinforced

The invention claimed is:

1. A method for manufacturing a fiber-reinforced composite material wherein a fiber-reinforced substrate containing a reinforcementing fiber (A) and a thermosetting resin (B) is sandwiched between release films (C) to constitute a layered material, and the layered material is pressed in a mold heated to molding temperature to thereby cure the thermosetting resin (B), wherein
the method satisfies the following (i), (ii), and (iii) or (i), (ii), and (iv):
(i) the fiber-reinforced composite material has at least 1 bent part,
(ii) the molding temperature is 130 to 180° C., and pressure application time is 0.5 to 20 minutes,
(iii) the release film (C) has a thermal contraction rate satisfying the following expressions (1) and (2):

$$0<Ta\leq 20 \qquad \text{expression (1), and}$$

$$1\leq Ta-Tb\leq 20 \qquad \text{expression (2),}$$

Ta: the thermal contraction rate (%) of the release film (C) measured by using a thermomechanical analyzer at the temperature the same as the molding temperature,
Tb: the thermal contraction rate (%) of the release film (C) measured by using a thermomechanical analyzer at a temperature 30° C. lower than the molding temperature, and
(iv) hardness of the fiber-reinforced substrate and the hardness of the release film (C) measured by using a durometer corresponding to JIS-K-7215, type A satisfy the following expressions (3) and (4):

$$0.8 \leq Hrc/Hrf \leq 1.2 \qquad \text{expression (3),}$$

$$1 < Hhc/Hhf \leq 1.5 \qquad \text{expression (4),}$$

Hrc: hardness of the release film (C) at 30° C.,
Hrf: hardness of the fiber-reinforced substrate at 30° C.,
Hhc: hardness of the release film (C) at the molding temperature,
Hhf: hardness of the fiber-reinforced substrate at the molding temperature.

2. A method for producing a fiber-reinforced composite material according to claim 1 wherein rounded section in the bent part has radius of curvature of up to 20 mm.

3. A method for producing a fiber-reinforced composite material according to claim 1 wherein number of the bent part is at least 3.

4. A method for producing a fiber-reinforced composite material according to claim 2 wherein the dispersion R calculated by the expression (5) is 0 to 0.2:

$$R=R_{sd}/R_{ave} \qquad \text{expression (5)}$$

wherein
Ra: arithmetic mean roughness of each face defined by the bent part,
$R_{ave}$: arithmetic mean calculated from the Ra, and
$R_{sd}$: standard deviation calculated from the Ra.

5. A method for producing a fiber-reinforced composite material according to claim 2 wherein the release film (C) is a polypropylene film.

6. A method for producing a fiber-reinforced composite material according to claim 3 wherein the fiber-reinforced composite material has an apex constituted by three faces each defined by the bent parts.

7. A method for producing a fiber-reinforced composite material according to claim 2 wherein number of the bent part is at least 3.

8. A method for producing a fiber-reinforced composite material according to claim 3 wherein the dispersion R calculated by the expression (5) is 0 to 0.2:

$$R=R_{sd}/R_{ave} \qquad \text{expression (5)}$$

wherein
Ra: arithmetic mean roughness of each face defined by the bent part,
$R_{ave}$: arithmetic mean calculated from the Ra, and
$R_{sd}$: standard deviation calculated from the Ra.

9. A method for producing a fiber-reinforced composite material according to claim 3 wherein the release film (C) is a polypropylene film.

10. A method for producing a fiber-reinforced composite material according to claim 6 wherein the dispersion R calculated by the expression (5) is 0 to 0.2:

$$R=R_{sd}/R_{ave} \qquad \text{expression (5)}$$

wherein
Ra: arithmetic mean roughness of each face defined by the bent part,
$R_{ave}$: arithmetic mean calculated from the Ra, and
$R_{sd}$: standard deviation calculated from the Ra.

11. A method for producing a fiber-reinforced composite material according to claim 1 wherein the dispersion R calculated by the expression (5) is 0 to 0.2:

$$R=R_{sd}/R_{ave} \qquad \text{expression (5)}$$

wherein
Ra: arithmetic mean roughness of each face defined by the bent part,
$R_{ave}$: arithmetic mean calculated from the Ra, and
$R_{sd}$: standard deviation calculated from the Ra.

12. A method for producing a fiber-reinforced composite material according to claim 1 wherein the release film (C) is a polypropylene film.

13. A method for producing a fiber-reinforced composite material according to claim 1 wherein the release film (C) is a multilayer film formed by lamination in the order of a surface layer (I)/a substrate layer (II)/a surface layer (I), or a multilayer film formed by lamination in the order of surface layer (I)/substrate layer (II); and the surface layer (I) is a layer containing polypropylene as its main component having a surface free energy of at least 15 mN/m and less than 28 mN/m.

14. A method for producing a fiber-reinforced composite material according to claim 13 wherein proportion of the total thickness of the surface layers (I) in the entire thickness of the release film (C) is up to 25%.

15. A method for producing a fiber-reinforced composite material according to claim 13 wherein substrate layer (II) contains 100 parts by mass of a thermoplastic resin (D) and 1 to 20 parts by mass of a particulate filler (E).

16. A method for producing a fiber-reinforced composite material according to claim 15 wherein the thermoplastic resin (D) is polypropylene.

17. A method for producing a fiber-reinforced composite material according to claim 1 wherein the fiber-reinforced substrate is a laminate of 2 or more prepregs each containing the reinforcing fiber (A) and the thermosetting resin (B).

18. A method for producing a fiber-reinforced composite material according to claim 1 wherein the reinforcing fiber (A) is a carbon fiber.

19. A method for producing a fiber-reinforced composite material according to claim 1 wherein the thermosetting resin (B) is an epoxy resin.

20. A method for producing a fiber-reinforced composite material according to claim 1 wherein the pressure during the pressure application is 0.1 to 10 MPa.

* * * * *